United States Patent

Waplington

[15] 3,696,776

[45] Oct. 10, 1972

[54] DIAL ASSEMBLIES

[72] Inventor: Gerald A. P. Waplington, Colchester, England

[73] Assignee: Gamet Products Limited, Hythe, Colchester, England

[22] Filed: Jan. 19, 1970

[21] Appl. No.: 3,918

[30] Foreign Application Priority Data

Jan. 30, 1969 Great Britain............5,192/69

[52] U.S. Cl..................................116/115.5, 33/126
[51] Int. Cl. .............................................B23q 17/00
[58] Field of Search...........116/115, 115.5, 124, 133; 33/126, 166; 74/812, 813, 10.54, 10.8

[56] References Cited

UNITED STATES PATENTS

| | | |
|---|---|---|
| R26,527 | 2/1969 | Rabinow.................116/115.5 |
| 1,027,549 | 5/1912 | Kronert............116/115.5 UX |
| 1,444,565 | 2/1923 | Smith..........................33/126 |
| 3,160,137 | 12/1964 | Simon....................116/133 X |
| 3,418,965 | 12/1968 | Rabinow.................116/115.5 |

*Primary Examiner*—Louis J. Capozi
*Attorney*—Stevens, Davis, Miller & Mosher

[57] ABSTRACT

A dial assembly for use on a machine tool to enable readings to be taken selectively on the Imperial or Metric scales of measurement, including two gear wheels having the appropriate conversion ratio and a pinion in constant mesh with both gear wheels, a pinion carrier frictionally driven by a shaft and a clutch, part of which may be moved to prevent rotation of the pinion carrier or to permit such rotation with attendant revealing of the appropriate scale.

6 Claims, 7 Drawing Figures

DIAL ASSEMBLIES

This invention relates to dial assemblies which are readily adjustable for taking measurements of linear movement of a member on either one of two scales.

In certain machines in the machine tool industry, it is necessary for adjustment of members to be made by rotation of a hand wheel. Such members may be moved by rotation of a lead screw rotated by the hand wheel. Machines manufactured under the Imperial system of measurement would have the lead screw pitch in fractions of an inch and the dial, associated with the hand wheel, would be calibrated accordingly. However, it may be desired to measure movements of the member by rotation of the hand wheel in Metric units without the necessity of changing the lead screw and it is the main object of this invention to provide a dial assembly which will enable movements of the member to be measured in either one of both scales without changing the lead screw.

According to the present invention there is provided a dial assembly for use on a machine tool, including a first gear wheel adapted to be fixed for rotation with a shaft and a second gear wheel fixed for rotation with a dial having graduations on both the Imperial and Metric scales marked circumferentially thereon, an idler pinion constantly in mesh with both the first and second gear wheels, said idler pinion being carried by a pinion carrier frictionally driven by rotation of the shaft and a clutch member slidable axially of the shaft and capable of selectively preventing or permitting rotation of the pinion carrier about the shaft, the first and second gear wheels having a conversion ratio from one unit measurement to the other.

In a further feature of the invention, the first gear wheel is keyed to a sleeve which is keyed to the shaft, the said sleeve carrying the second gear wheel and the dial and also the pinion carrier.

In a still further feature of the invention, the clutch member forms part of a clutch which selectively exposes one of the two scales simultaneously with preventing or permitting rotation of the pinion carrier, the clutch also having datum marks against which readings on the two scales may be taken.

In order to illustrate the invention, one embodiment thereof will now be described, by way of example only, with reference to the accompanying drawing, in which.

Figure 1:
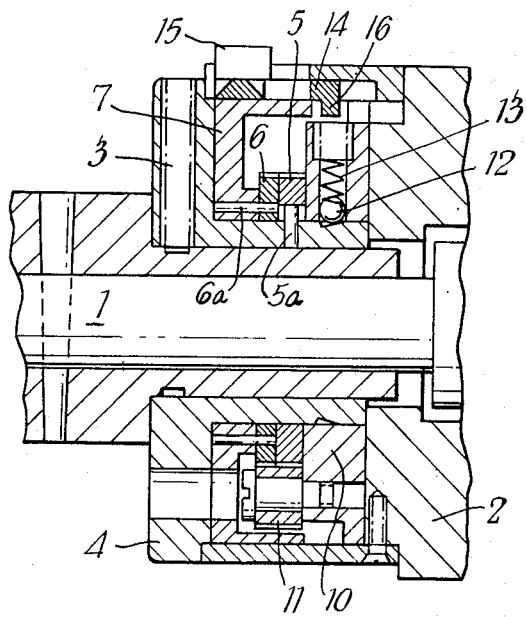
FIG. 1 is a longitudinal cross-sectional view of a dial assembly in accordance with the invention mounted on a shaft.

A shaft 1 is driven, through reduction gearing, by a hand wheel (not shown) and this shaft 1 drives, also through reduction gearing, the lead screw of a machine to which anchor plate 2 is fixed. Fixed by pin 3 to shaft 1 is a sleeve 4 to which a first gear wheel 5 is fixed by pin 5a for rotation with shaft 1. Also carried by sleeve 4 but free to rotate independently thereof is a second gear wheel 6 fixed by pin 6a for rotation with a dial 7.

Figure 2:
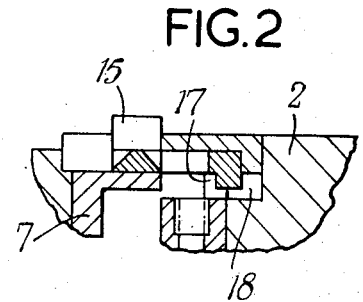
FIG. 2 is a fragmentary view of FIG. 1 showing the sliding clutch in its alternative position.
Figure 3:
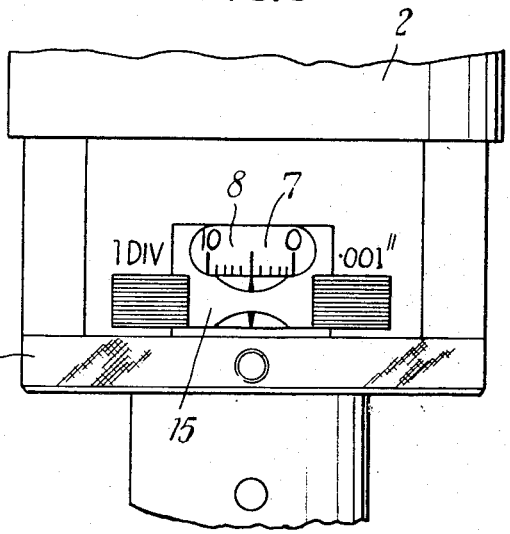
FIG. 3 is a plan view of FIG. 1.
Figure 4:
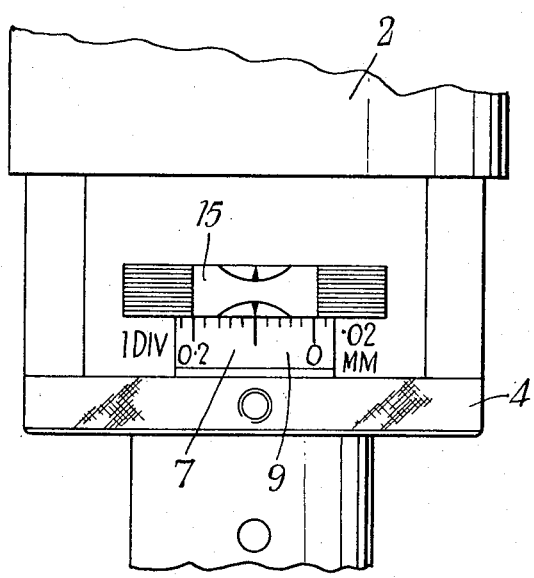
FIG. 4 is a plan view of FIG. 1 with the clutch in the position illustrated in FIG. 2.
Figure 5:
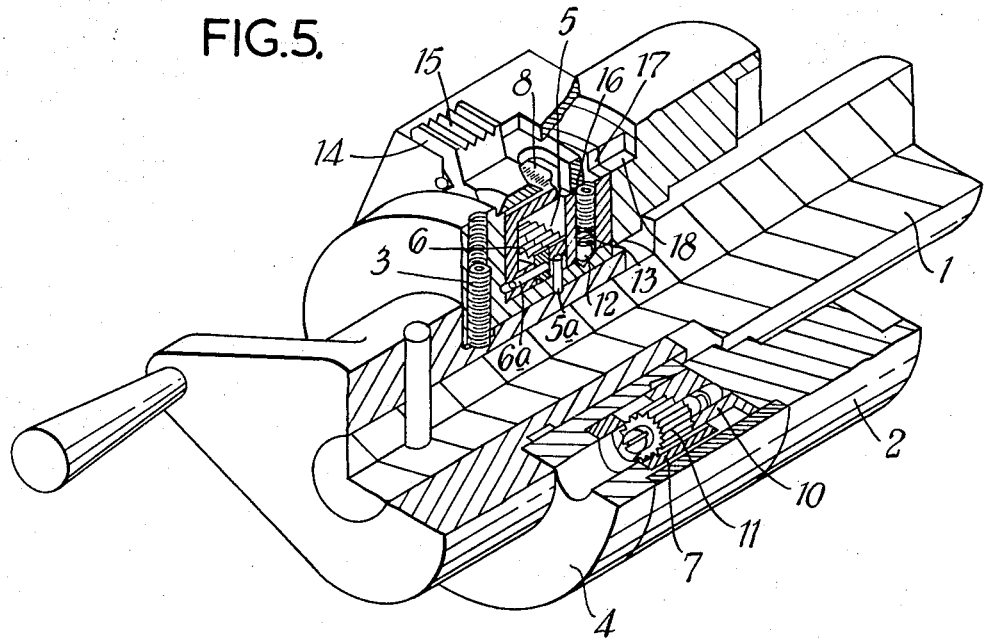
FIG. 5 is a perspective view.
Figure 5A:
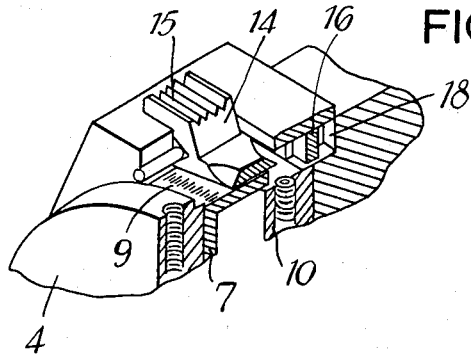
FIGS. 5a and 5b are details of the embodiment shown in FIG. 5.
Figure 5B:
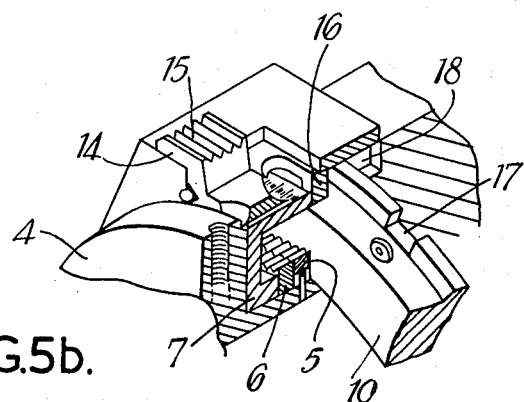

This dial 7 has two sets of graduations marked circumferentially thereon, the Imperial scale being indicated at 8 in FIG. 3 and the Metric scale being indicated at 9 in FIG. 4. Also freely carried by sleeve 4 is a pinion carrier 10 having an idler pinion 11 constantly in mesh with gear wheels 5 and 6. The pinion carrier 10 has a ball 12 loaded by spring 13 whereby the pinion carrier may be frictionally driven by shaft 1. A clutch 14 is movable axially of shaft 1 by finger grip 15 from the position illustrated in FIG. 1 in which dog 16 is out of engagement with teeth 17 on pinion carrier 10 and teeth 18 on anchor plate 2 to the position illustrated in FIG. 2 in which the clutch is engaged and vice versa.

The lead screw has a pitch on the Imperial scale and with the position of the clutch 14 as illustrated in FIG. 1 and FIG. 3, rotation of shaft 1 will cause similar rotation of the gear wheels 5 and 6, the pinion 11 and pinion carrier 10 and also the dial 7. With the clutch in this position, the Imperial scale 8 is exposed as shown in FIG. 3 and readings may be taken.

If the clutch is moved to the position illustrated in FIGS. 2 and 4, the pinion carrier 10 and hence pinion 11 will be prevented from rotation about shaft 1 and hence when shaft 1 is rotated by the hand wheel, the gear wheel 5 will rotate at a different speed to gear wheel 6 thus giving the desired conversion ratio from Imperial to Metric units. With the clutch in this position the Metric scale 9 is exposed and readings on this scale may be taken.

The gear wheels 5 and 6 have a different number of teeth one to the other, the gear ratio being related to the Imperial pitch of the screw and the desired Metric units. If conversion is desired from Metric to Imperial units of like order then the gear wheels 5 and 6 will be reversed.

The provision of sleeve 4 is not essential to the performance of the invention; the gear wheel 5 may be keyed directly onto the shaft 1 or some other member fixed for rotation with shaft 1.

I claim:

1. A dial assembly for use on a machine tool having a shaft for driving a member, comprising:

a first gear wheel fixed to the shaft for rotation therewith;

a second gear wheel freely rotatable on said shaft;

an annular dial fixed to said second gear wheel for rotation therewith and having graduations in first and second scales of measurement marked circumferentially thereon;

said first and second gear wheels having a conversion ratio from said first measurement scale to said second scale;

an annular pinion carrier rotatable with said shaft;

an idler pinion carried by said pinion carrier in meshing engagement with said first and second gear wheels;

means frictionally connecting said pinion carrier and said shaft, whereby said pinion carrier is driven by rotation of said shaft; and a clutch slidable axially of said shaft, said clutch comprising:

a clutch member movable to a first position into engagement with said pinion carrier, thereby locking said pinion carrier against rotation about said shaft and to a second position in which said pinion carrier is rotatable about said shaft.

2. A dial assembly according to claim 1, further comprising:
a sleeve keyed to said shaft, said sleeve carrying said second gear wheel, said dial and said pinion carrier, the said first gear wheel being keyed to said sleeve.

3. A dial assembly according to claim 1, wherein said clutch further comprises means for selectively exposing one of said scales for viewing.

4. A dial assembly according to claim 3, wherein said selective exposing means has datum marks thereon against which readings on said scales are taken.

5. A dial assembly for use on a machine tool having a hand wheel for rotating a shaft which drives a lead screw having a pitch in the Imperial system of measurement, comprising:
a sleeve keyed to said shaft for rotation therewith,
a first gear wheel keyed to said sleeve,
a second gear wheel freely rotatable on said shaft,
an annular dial having graduations on both the Imperial and Metric scales marked circumferentially thereon, said annular dial being fixed to said second gear wheel for rotation about said shaft,
an idler pinion in meshing engagement with both said first gear wheel and said second gear wheel,
a pinion carrier rotatable on said shaft and having said idler pinion attached thereto,
means frictionally connecting said pinion carrier with said shaft, whereby rotation of said shaft and said sleeve frictionally drives said pinion carrier, and
a clutch, comprising
a dog slidable axially of said shaft and selectively engaging said pinion carrier to prevent rotation thereof about said shaft,
said first and second gear wheels having a conversion ratio from Imperial to Metric units.

6. A dial assembly according to claim 5, wherein:
said friction means includes a ball housed in a recess in said pinion carrier, and
a spring biasing said ball into contact with said sleeve,
whereby said pinion carrier is frictionally driven by rotation of said shaft.

* * * * *